(12) United States Patent
Fila et al.

(10) Patent No.: US 7,015,436 B2
(45) Date of Patent: Mar. 21, 2006

(54) APPARATUS FOR THE HEAT TREATMENT OF FOODSTUFFS AND FEEDSTUFFS, IN PARTICULAR FOR THE PRODUCTION OF BAKERY PRODUCTS

(75) Inventors: Rudolf Fila, Maria Enzersdorf (AT); Joseph Roeckel, Wittersheim (FR); Garry Dean Moppett, Berks (GB); Stefan Trojer, Graz (AT)

(73) Assignee: Masterfoods Austria OHG, Breitenbrunn (AT)

( * ) Notice: Subject to any disclaimer, the term of this patent is extended or adjusted under 35 U.S.C. 154(b) by 0 days.

(21) Appl. No.: 10/819,422

(22) Filed: Apr. 7, 2004

(65) Prior Publication Data

US 2004/0250692 A1   Dec. 16, 2004

(30) Foreign Application Priority Data

May 22, 2003  (AT)  ................................. 793/2003

(51) Int. Cl.
*H05B 6/12*  (2006.01)
*H05B 6/44*  (2006.01)

(52) U.S. Cl. ...................... 219/622; 219/624; 219/653; 219/601; 219/388; 99/451; 99/443 C

(58) Field of Classification Search ........ 219/622–627, 219/653–658, 388, 601; 99/451, DIG. 14, 99/443 C, 450.1, 450.4, 450.6
See application file for complete search history.

(56) References Cited

U.S. PATENT DOCUMENTS

| | | | | |
|---|---|---|---|---|
| 3,646,880 | A | * | 3/1972 | Norris .......................... 99/349 |
| 4,258,241 | A | * | 3/1981 | Soworowski ............... 219/656 |
| 5,862,743 | A | * | 1/1999 | Cimenti ..................... 99/450.2 |
| 2003/0015523 | A1 | * | 1/2003 | Nishinomiya et al. ...... 219/653 |

FOREIGN PATENT DOCUMENTS

JP           59-232077       * 12/1984

* cited by examiner

*Primary Examiner*—Philip H. Leung
(74) *Attorney, Agent, or Firm*—Laurence A. Greenberg; Werner H. Stemer; Ralph E. Locher

(57) ABSTRACT

An apparatus for the heat treatment of foodstuffs and feedstuffs, in particular for the production of bakery products, such as wafer products, has a continuously moving conveying device, a device for depositing the product on the conveying device, and a device for removing the heat-treated product from the conveying device. The conveying device is formed by an endless conveyor belt that can be circulated between two return rollers and which is formed by a ferromagnetic metal strip, in particular by a steel strip. A heating device is provided on one side of the conveyor belt and includes a group of induction heaters.

21 Claims, 10 Drawing Sheets

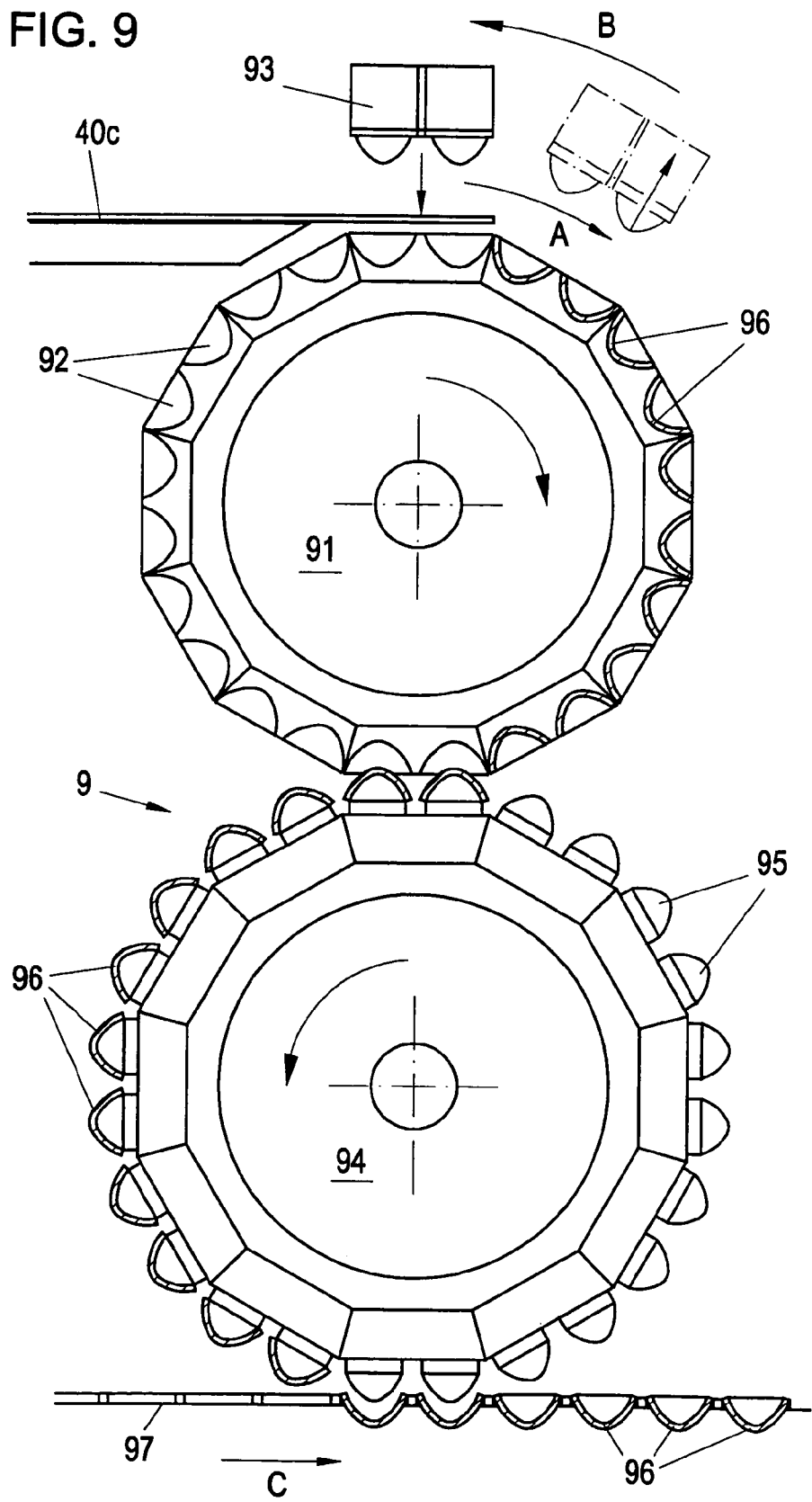

APPARATUS FOR THE HEAT TREATMENT OF FOODSTUFFS AND FEEDSTUFFS, IN PARTICULAR FOR THE PRODUCTION OF BAKERY PRODUCTS

BACKGROUND OF THE INVENTION

Field of the Invention

The present invention relates to an apparatus for the heat treatment of foodstuffs and feedstuffs, in particular for the production of bakery products, having a continuously moving conveying device, at least one heating device assigned to the conveying device, a device for depositing the product on the conveying device, and a device for removing the heat-treated product from the conveying device.

The present invention furthermore relates to a system for the production of products produced from a baked product.

A prior art apparatus for the production of bakery products comprises a drum which is produced from metal, is rotated continuously and is heated by way of induction heating. A depositing device is used to deposit a dough on the outside or inside of the drum. The heating of the drum bakes the dough on the drum. The baked product is subsequently removed from the drum and passed on for further processing. Since the baked product is deformable when hot, it can be deformed, for example, to form small rolls which are subsequently filled with cream.

However, in many respects this prior art apparatus does not meet the existing requirements:

Due to the fact that the dough is deposited on a drum which is rotating, the maximum thickness of the baked dough is therefore limited to approximately 1.2 mm since, for products of greater thickness, the heated drum does not apply the requisite heat to these products.

In contrast, there is, however, the desire to be able to produce bakery products with substantially greater thicknesses in order to be able to produce a very wide variety of products from them.

Since, in addition, the drum, which is produced from steel, has a maximum diameter of approximately 2.2 m and a width of approximately 500 mm, it has to have a wall thickness of approximately 25 mm to 30 mm in order to obtain the required mechanical stability. For heating the drum, an induction heater is provided at a single location on the drum, which encloses the drum and is used to inductively heat the entire drum to a temperature of approximately 160° C. On account of the arrangement and design of the inductive heating at only one point on the drum and, further, on account of the drum's large wall thickness, it is not possible to heat the drum uniformly over its entire circumference. The high heat capacity of the drum also means that it is not possible to control the temperature profile of the drum to precise values. It is similarly not possible to control the temperature of the drum over the baking process period. Furthermore, the temperatures over the width of the drum differ to the effect that it has substantially lower temperatures in its two border regions than in its central regions, with these differences in temperature being up to 10° C. In particular, control of the drum temperature is also made more difficult by the fact that the heat removed by the baking process depends on that period of time during which the baking product is located on the drum, as well as the amount of liquid which has evaporated from the baking product.

Overall, the prior art drum can therefore only be controlled within very wide limits as regards the temperatures required for the baking process and the temperatures also differ greatly over the width of the drum. As a result, the quality of the baking process does not meet the existing requirements.

A further disadvantage of the prior art drum resides in the fact that an increase in its diameter is not possible on account of its great weight, that an increase in its width is possible with difficulty on account of the arrangement of the induction heating and that also its rotational speed can be increased only within narrow limits. For these reasons, increases in production can scarcely be undertaken with the known drum.

Summarizing the above statements, the prior art heated drum is therefore only suitable for the production of a baked wafer dough with very limited thicknesses and it cannot be used for the production of other bakery products, on account of the very irregular distribution of temperature over its surface and of the fact that an exact control of the temperature is not possible, the baking process is poor in terms of quality and the structural design of the drum means that it cannot be enlarged in order to increase production.

SUMMARY OF THE INVENTION

It is accordingly an object of the invention to provide an apparatus for the heat treatment of foodstuffs or feedstuffs, in particular for baking doughs, which overcomes the above-mentioned disadvantages of the heretofore-known devices and methods of this general type.

With the foregoing and other objects in view there is provided, in accordance with the invention, an apparatus for the heat treatment of foodstuffs or feedstuffs, for example to form bakery products, comprising:

a continuously moving conveying device formed with two return rollers and an endless conveyor belt formed of a ferromagnetic metal strip, such as a steel strip, and disposed to be circulated about said return rollers;

a device for depositing product to be heat-treated on the conveying device;

a device for removing heat-treated product from the conveying device; and a heating device disposed on one side of said conveyor belt and formed with a group of induction heaters.

In other words, the object of the invention are achieved by the conveying device being formed by an endless conveyor belt which can be circulated between two return rollers, by the conveyor belt being formed by a ferromagnetic metal strip, in particular by a steel strip, and by the heating device being formed by a group of induction heaters. The induction heaters are preferably located on the side of the conveyor belt facing away from the baking product. The individual induction heaters can also preferably be adjusted in their distance from the conveyor belt. In addition, further heating devices, in particular infrared heaters, can be provided on the other side of the conveyor belt.

According to a preferred embodiment, the return rollers are situated at least approximately horizontally next to each other with it being possible for the conveyor belt to be moved in an at least approximately horizontal direction.

At least one of the two return rollers is preferably assigned a heating device as well. In particular, the return rollers are formed by drums which are manufactured from ferromagnetic metal, in particular from steel, and the heating devices assigned to the return rollers are formed by induction heaters. Furthermore, a tensioning device can be provided by means of which the mutual distance between the return rollers and therefore the tension of the conveyor belt can be adjusted. Furthermore, between the return rollers support rollers are preferably provided below the upper side of the conveyor belt.

According to a preferred embodiment, the apparatus for depositing the product, in particular a dough, is situated above the roller which is in front in the direction of movement of the conveyor belt, the product being deposited on the conveyor belt in that region in which said conveyor belt rests on the return roller. Furthermore, the conveyor belt and the heating devices are preferably surrounded by a thermally insulating housing.

Furthermore, the device for depositing the dough on the conveyor belt is preferably constructed with a cooling apparatus. In this case, the depositing device for the dough can be formed by a feeding device having a gap which can be adjusted in its height or by two counter-rotatable rollers which can be adjusted in their mutual distance from each other.

A preferred system for the production of baked products which are composed of at least two sheets and a foodstuff situated between the latter, this system containing an apparatus of this type as part of it, has furthermore a device for depositing a foodstuff on the upper side of the baked product, a device for laying the two halves of the baked product on each other, a device for pressing the two halves together, and a deforming and dividing device for the production of the individual products.

According to one design variant, two apparatuses for producing wafer strips are provided, one of these apparatuses being assigned a device for depositing a further foodstuff onto a first wafer strip, and the wafer strips produced by the two apparatuses being laid on each other with the further foodstuff positioned in between, and, furthermore, an apparatus for pressing these two wafer strips together is provided.

Other features which are considered as characteristic for the invention are set forth in the appended claims.

Although the invention is illustrated and described herein as embodied in a apparatus for the heat treatment of foodstuffs and feedstuffs, in particular for the production of bakery products, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 6 and 6A to 6D are schematic illustrations of the possible alignments of the conveyor belt in an apparatus according to the invention;

FIG. 9 is a side view of a device in the system according to FIG. 7, which is used for producing three-dimensionally deformed wafers.

DESCRIPTION OF THE PREFERRED EMBODIMENTS

Figure 1:
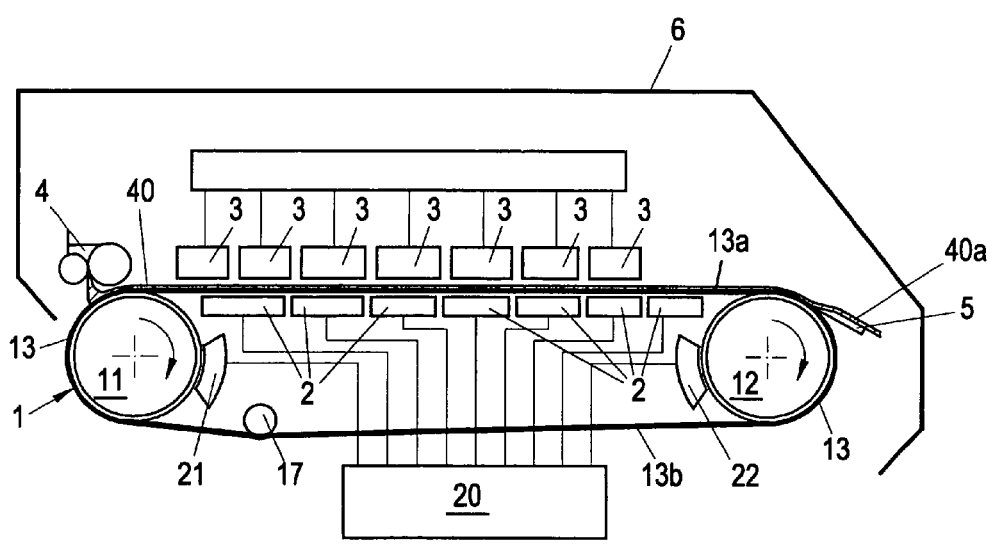
FIG. 1 shows a first embodiment of an apparatus according to the invention, in side view.

Referring now to the figures of the drawing in detail and first, particularly, to FIG. 1 thereof, there is shown the novel apparatus with a conveying device 1 formed by a conveyor belt 13 which is guided over two return rollers 11 and 12. The conveyor belt 13 is formed from a ferromagnetic sheet metal, in particular of sheet steel. A group of induction heaters 2 is provided below the upper run 13a of the conveyor belt 13. The induction heaters 2 are connected to a controllable supply device 20. The induction heaters 2 are located on that side of the conveyor belt 13 which faces away from that side to which the baking product is applied. A group of infrared heaters 3 is situated above the upper run 13a of the conveyor belt 13. The IR heaters 3 are located on the side of the baking product.

A depositing device 4 (i.e., a feeder 4) is assigned to the left end of the conveying device 1 and a removal device 5 (i.e., a delivery) is assigned to the right end of the conveying device 1. The entire device is surrounded by a heat-insulating housing 6. The return rollers 11 and 12, which likewise consist of a ferromagnetic metal, in particular of steel, are assigned further induction heaters 21 and 22 which are likewise connected to the supply device 20. A guide roller 17 is furthermore assigned to the lower run 13b of the conveyor belt 13.

The conveyor belt 13, which has a width of 0.3 m to 1.5 m, is circulated over the return rollers 11 and 12 at a speed of between 2 m/min and 12 m/min. The induction heaters 2 heat the upper side 13a of the conveyor belt 13, with it being possible for the heating power of the individual induction heaters 2, disposed along the path of movement of the upper side 13a of the conveyor belt 13, to be controlled by means of the supply device 20. In addition, the induction heaters 21 and 22 are also used to heat the return rollers 11 and 12. Furthermore, temperature sensors are assigned to the conveyor belt for temperature control.

A product 40, which is to be subjected to a heat treatment, is deposited on the upper side 13a of the conveyor belt 13 by the depositing device 4. Over the course of the transportation of the product 40, the latter is heated from below by the run 13a being heated by way of the induction heaters 2. The product is heated from above by the infrared heaters 3. In the region of the second return roller 12, the product 40a, which has been subjected to heat treatment, is removed from the upper side 13a by means of the removal device 5.

In order to be able to largely avoid heat losses and to ensure a precise heat treatment of the product, the entire apparatus is enclosed by the heat-insulating housing 6.

Figure 2:
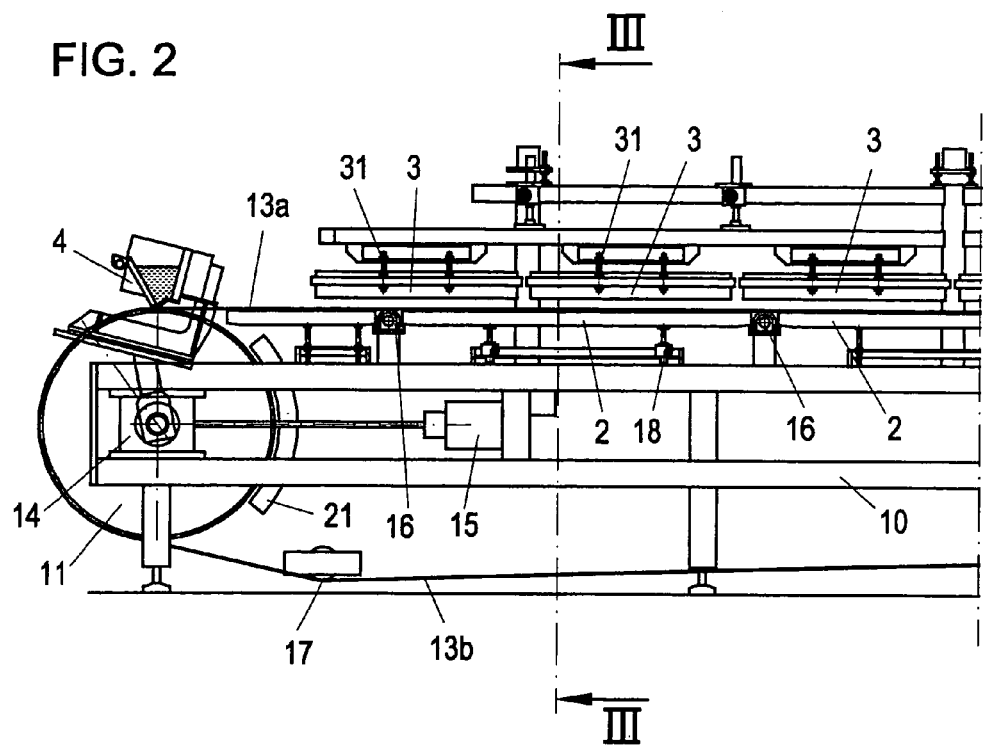
FIG. 2 and FIG. 2A show the apparatus according to FIG. 1, in side views giving more detail than in FIG. 1.
Figure 2A:
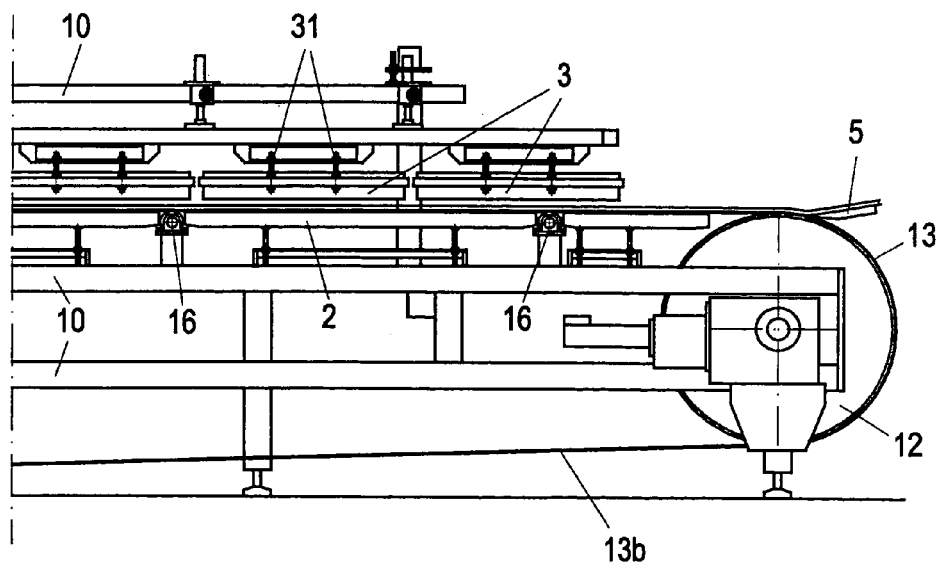
Figure 3:
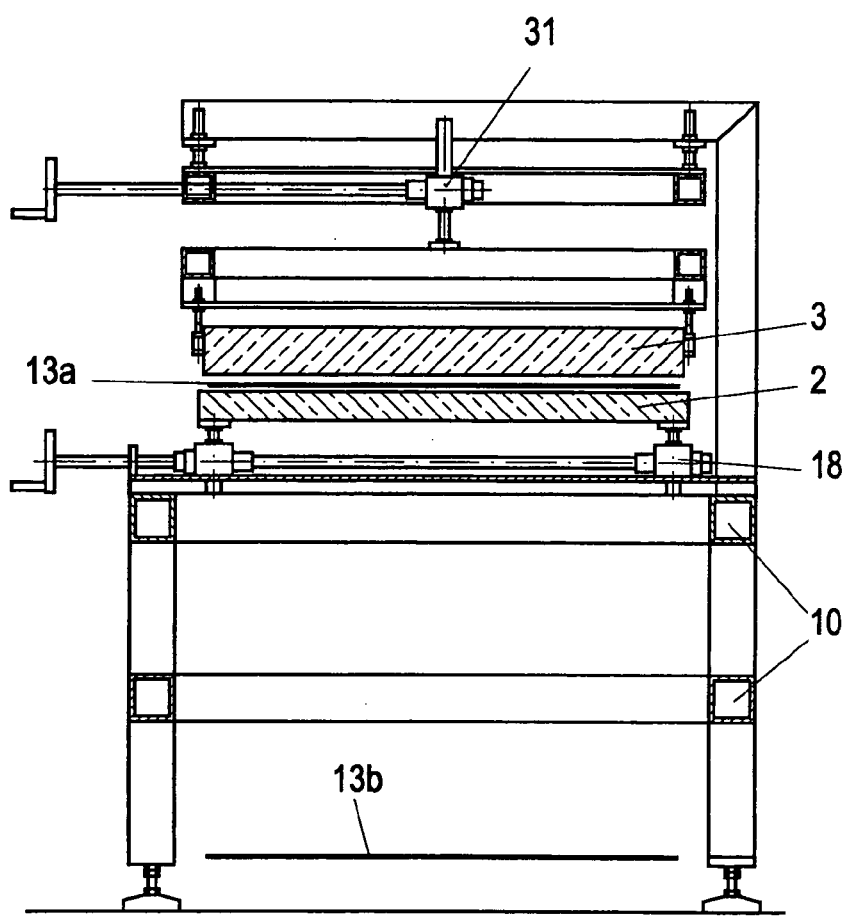
FIG. 3 shows the apparatus according to FIG. 1, in a section taken along the line III—III of FIG. 2.

The structural design of the apparatus according to FIG. 1 is explained in more precise detail below:

As can be seen from FIGS. 2 and 2A and from FIG. 3, the return rollers 11 and 12 are arranged on a supporting framework 10 from which the return roller 12 is directly mounted, whereas the return roller 11 is mounted on a slide 14 which can be displaced by means of a spindle drive 15. This enables the tension of the conveyor belt 13 to be adjusted. Furthermore, induction heaters 2, which can each be adjusted in their distance relative to the upper side 13a of the conveyor belt 13 by means of adjusting devices 18, are also situated on the supporting framework 10. In order to obtain optimum efficiency, this distance must be as small as possible.

Furthermore, support rollers 16 for the upper side 13a of the conveyor belt 13 are situated between the individual induction heaters 2. In addition, the lower side 13b of the conveyor belt 13 is assigned the guide device 17 for the conveyor belt 13. The infrared heaters 3 are situated on vertically adjustable supporting devices 31, as a result of which they can likewise be adjusted in their distance relative to the upper side 13a of the conveyor belt 13.

If a dough which is to be subjected to a baking process is deposited by the depositing device 4, the upper side 13a of the conveyor belt 13 is heated in the region of the depositing device to approximately 180° C. to 210° C. The baking process is carried out by the induction heaters 2 by means of which the upper side 13a of the conveyor belt 13 is heated to approximately 130° C. to 200° C. The infrared heaters 3 carry out a surface treatment, in particular browning, of the product being baked.

Instead of a dough or batter, this apparatus also enables any other desired foodstuff or animal feedstuff to be subjected to a heat treatment.

In comparison with the known prior art, which relates to the production of bakery products, this apparatus obtains the following crucial advantages:

Owing to the fact that the conveyor belt 13 has only a small heat capacity and since, furthermore, its heating is carried out by a plurality of induction heaters 2 arranged below its path of movement, a precise control of its temperature is possible, and, in addition, a control incorporating different temperatures can be undertaken over the length of the path of movement of the same. Furthermore, an exact control of the temperature over the width of the conveyor belt 13 can be undertaken to the effect that said conveyor belt has virtually the same temperatures in the central region and in the side regions. These facts decisively improve the quality in the heat treatment, in particular the quality of the baking processes.

If baking processes are undertaken by means of this apparatus, then, since the dough is deposited on the upper side of the conveyor belt, bakery products are produced which are substantially thicker than had been the case using the known apparatuses. This substantially increases the range of use of an apparatus of this type and the multiplicity of products which can be produced by means of an apparatus of this type.

Furthermore, owing to the structural design of an apparatus of this type, it is possible without any difficulty to increase the production capacity by increasing the conveying speed and by increasing the width of the conveyor belt.

Figure 4:
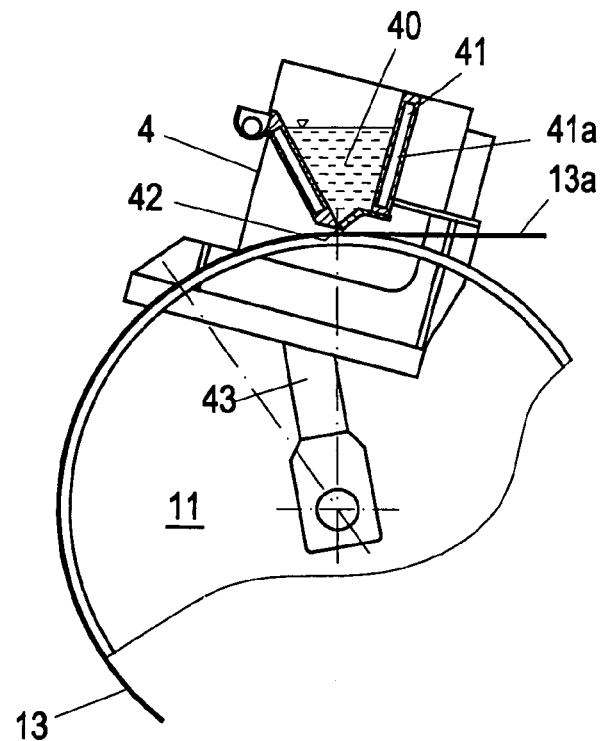
FIG. 4 shows a first embodiment of a device for depositing a dough on the conveyor belt of the apparatus according to FIG. 1.

FIG. 4 illustrates a first embodiment of a depositing device 4. This device comprises a funnel-shaped container 41 which is constructed, at its lower end, which is situated above the return roller 11, with a slot-like depositing opening 42 which extends over the entire operative width of the conveyor belt 13. The container 41 is arranged on a supporting arm 43 which can be pivoted about the axis of the return roller 11. This pivotability enables the position of the depositing opening 42 relative to the conveyor belt 13 to be adjusted. Since the container 41 is constructed with a water-cooled double jacket 41a, the product 40 situated in it is protected from the heat radiated by the return roller 11 and is thus not influenced by it. This product 40 is formed, in particular, by a viscous dough mass for the production of bakery products, in particular wafers.

Figure 4A:
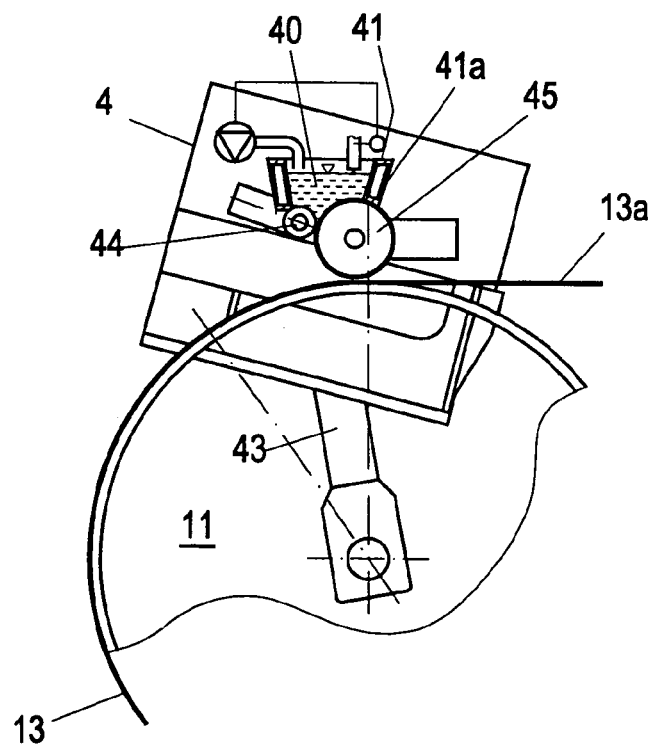
FIG. 4A shows a second embodiment of a device for depositing a dough on the conveyor belt of the apparatus according to FIG. 1 in a side view.

FIG. 4A illustrates an alternative embodiment of a depositing device 4 which is constructed, at its lower end, with two depositing rollers 44 and 45 which are used to deposit the product 40 on the upper side 13a of the conveyor belt 13.

Figure 5:
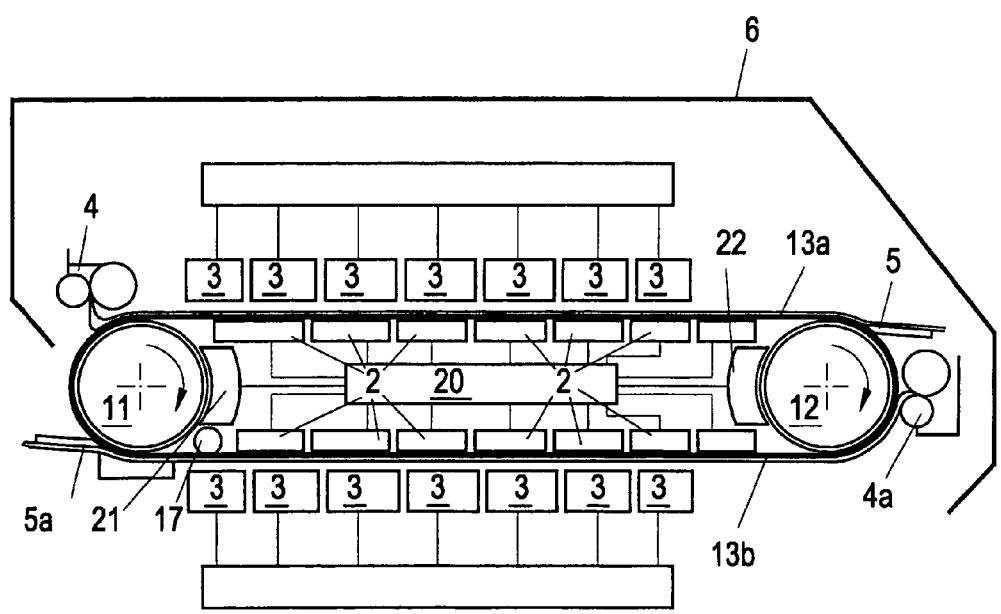
FIG. 5 is a schematic side view of a second embodiment of the apparatus according to the invention.
Figure 6:
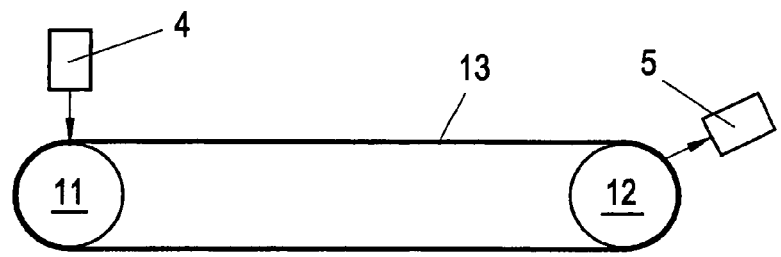
Figure 6:
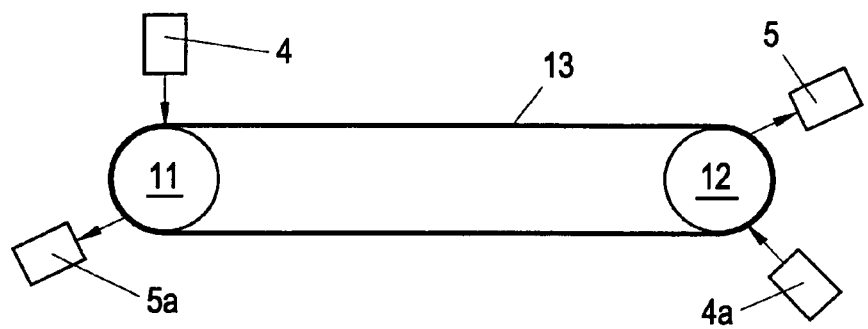
Figure 6:
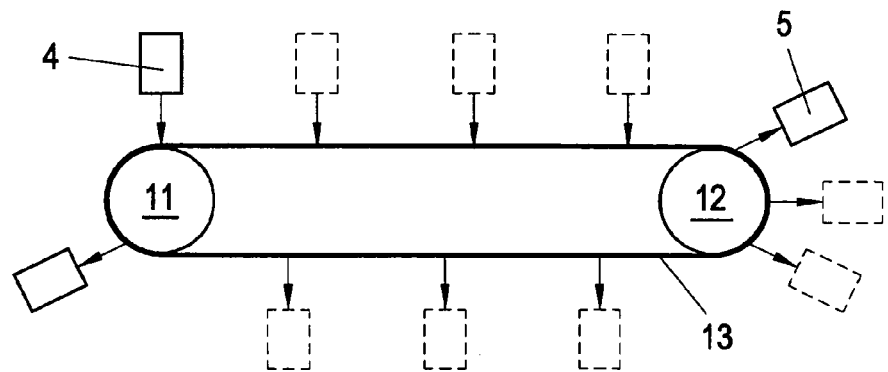
Figure 6C:
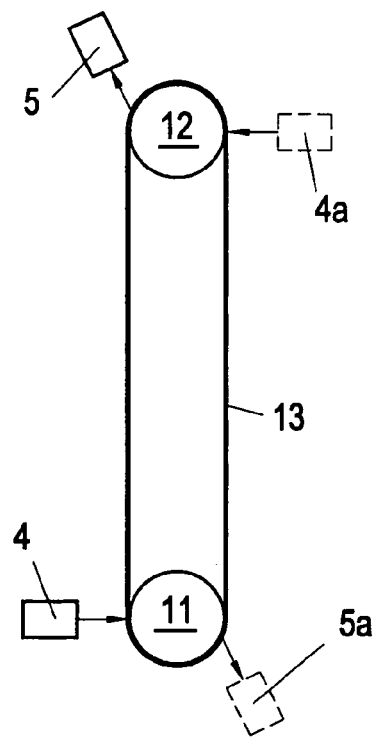
Figure 6D:
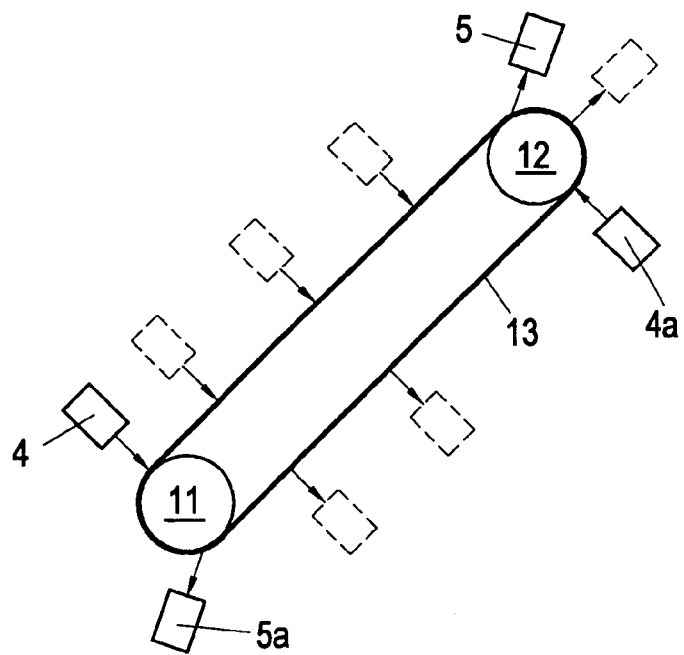

FIG. 5 illustrates an embodiment of an apparatus according to the invention, which embodiment has been modified with respect to FIG. 1 to the effect that both the upper side 13a and the lower side 13b of the conveyor belt 13 are assigned induction heaters 2 and infrared heaters 3, with a further depositing device 4a being situated in the region of the second return roller 12 and a removal device 5a assigned to the further depositing device 4a being situated in the region of the first return roller 11. In this case too, the induction heaters 2 are in each case located on that side of the conveyor belt 13 which faces away from the baking product.

With reference to the schematic views of FIGS. 6, and 6A to 6D, in the case of an apparatus according to the invention for the heat treatment of foodstuffs, there are no restrictions as regards the alignment of the conveyor belt 13 and the assignment of the devices 4, 4a and 5, 5a for respectively depositing or removing, the product on or from the conveyor belt 13. The conveyor belt 13 can thus be aligned horizontally and obliquely and also vertically. In addition, the depositing devices 4, 4a and the removal devices 5, 5a can be situated at any desired locations on the conveyor belt 13.

Figure 7:
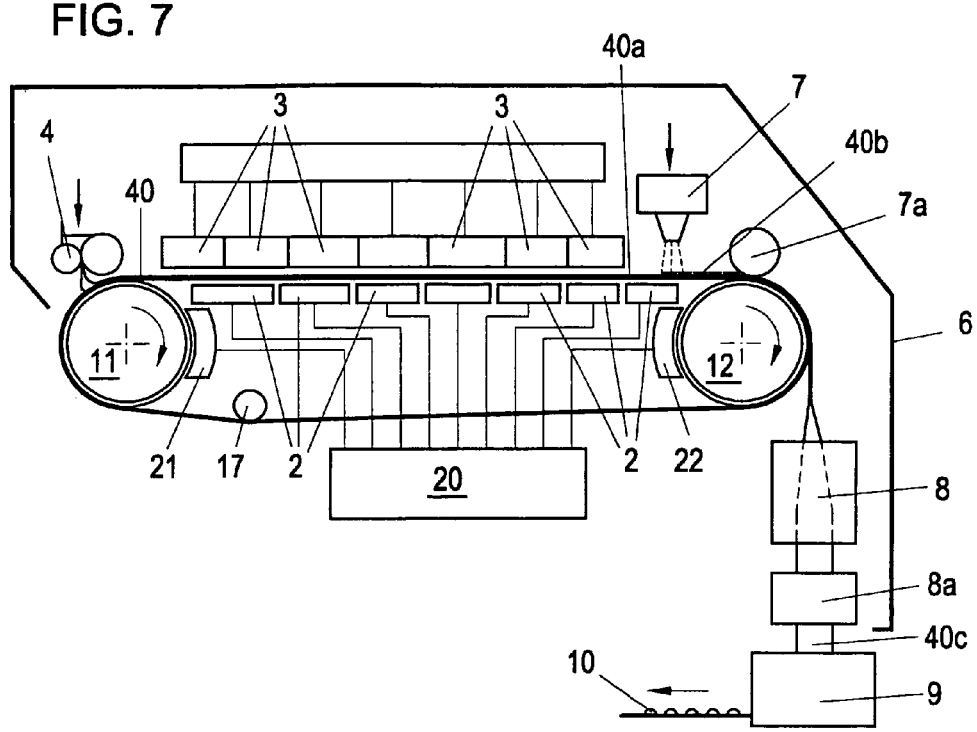
FIG. 7 shows a system for the production of multilayer wafer products using an apparatus according to the invention, in a schematic side view.

A system for the production of wafer or waffle products using a baking apparatus according to the invention is explained below with reference to FIG. 7. In this system, the apparatus described with reference to FIG. 1 is assigned a device 7 in which a further foodstuff, in particular a protein-containing foodstuff, is deposited on the product 40a which has been baked in this apparatus and is still hot. Provided downstream is a roller device 7a which is used to press this further foodstuff into the baked product 40a. The baked product 40a is subsequently removed from the conveyor belt 13 and is passed on to a device 8 in which the two halves of the baked product 40a are folded over each other. This is possible without any difficulty, since the baked product is able to be deformed when hot. Provided downstream is a device 8a which is used to press the two halves together, as a result of which a double-layered wafer strip 40c is produced. This creates a product in which any other desired foodstuff, such as milk products, in particular cheese, meat products, fish products, fruit products and the like are situated between two layers of a bakery product. These two layers are connected to each other by means of protein-containing products or other products with adhering properties. Provided downstream is a device 9 which is used to produce three-dimensionally deformed products 10 which can be filled with further products.

Figure 7A:
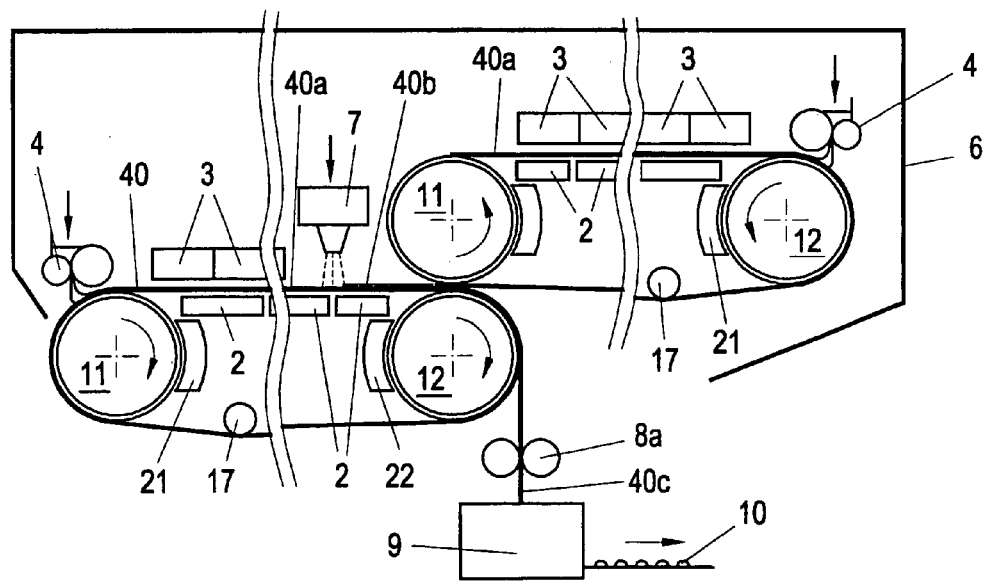
FIG. 7A shows a second embodiment of a system according to the invention for the production of multilayer wafer products, in a schematic side view.
Figure 8:
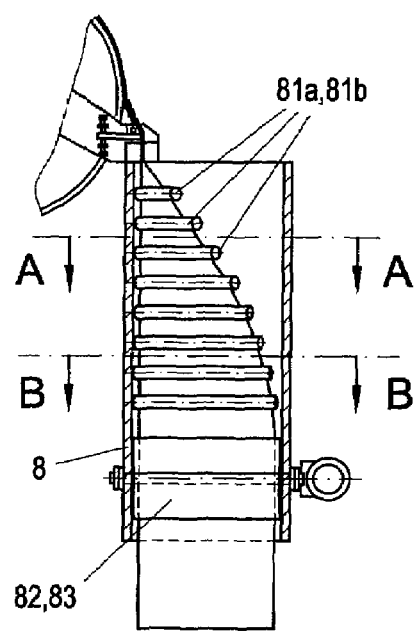
FIG. 8 shows a device in the system according to FIG. 7, which is used for folding a wafer strip, in four illustrations.
Figure 8A:
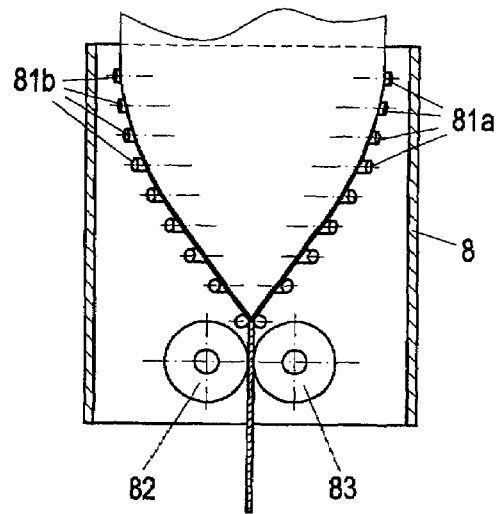
Figure 8B:
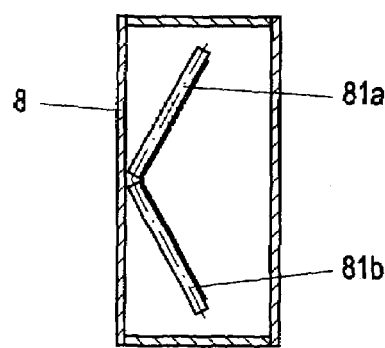
Figure 8C:
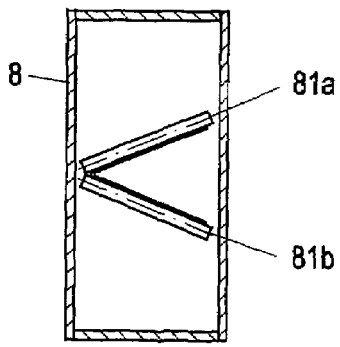

FIG. 7A illustrates an alternative embodiment of a system of this type, in which two apparatuses according to FIG. 1 are assigned to each other, the first of these apparatuses being used to produce a first wafer strip 40a which is coated with a foodstuff 40b. The baked, second wafer strip 40a, which is produced by the second apparatus, is deposited onto this coated strip. This multilayered strip containing a further foodstuff is then guided through a pressing device 8a, resulting in the production of the wafer strip 40c. This passes into the apparatus 9 in which three-dimensionally deformed products 10 are produced.

As is illustrated in FIGS. 8, 8A, 8B, and 8C, a device 8 for folding the two halves of a strip of baked wafer dough 40a over each other comprises a plurality of pairs of rollers 81a and 81b arranged below one another and enclosing ever smaller, acute angles with one another in the direction of movement of the strip 40a of baked dough, as a result of which the two halves are progressively guided towards each other until they come into contact with each other. Two rollers 82 and 83 which are used to press the two halves together are provided downstream.

FIG. 9 furthermore illustrates a device 9 which is used to deform the two folded-together halves of the baked dough, between which a further foodstuff is situated, to form three-dimensionally configured, individual products. This device comprises two counter-rotatable rollers 91 and 94, the roller 91 being designed with hollow shapes 92 on its circumferential surface and the roller 94 being designed with projections 95, which are of diametrically opposed design to the hollow shapes 92, on its circumferential surface. In addition, the roller 91 is assigned a ram 93.

The two-layered wafer strip 40c, which has been baked, is still hot and can therefore be deformed, is passed onto the roller 91. The ram 93 is thereupon moved into the associated hollow shapes 92 and moved together with the roller 91 in the direction of the arrow A. This causes the wafer strip 40c to be deformed into individual hollow bodies 96. Following this, the ram 93 is moved back, in the direction of the arrow B, to its starting position. On further rotation of the roller 91, the hollow bodies 96 pass into the region of the projections 95 which protrude from the counter-rotating roller 94 and by which they are taken over. Finally, the hollow bodies 96 pass into the region of a supporting grid 97 which is moved in the direction of the arrow C and to which they are transferred, they then being passed on for further processing.

A system of this type enables any desired two-layered wafer products containing further foodstuffs to be produced for use as foodstuffs for people or for animals.

In particular, the apparatus according to the invention and the system according to the invention can be used to produce single-layer and multilayered wafer strips, with it being possible for further foodstuffs to be situated between the individual layers. These further foodstuffs can be used to impart any desired taste properties to the wafer strips. On account of the high sugar content of the wafer dough—amounting to at least 20% by weight, the baked product strips which are still hot can be deformed, making it possible to give them any desired three-dimensional configurations These three-dimensional bodies can be used as containers for further foodstuffs. Thus, for example, shell-shaped bodies can be filled with chocolate.

Products of this type, in particular wafer products, can be used with a multiplicity of taste properties and three-dimensional configurations as foodstuffs or as feedstuffs.

This application claims the priority, under 35 U.S.C. § 119, of Austrian patent application No. A 793/2003, filed May 22, 2003; the entire disclosure of the prior application is herewith incorporated by reference.

We claim:

1. An apparatus for the heat treatment of foodstuffs or feedstuffs, comprising:
    a continuously moving conveying device formed with two return rollers and an endless conveyor belt formed of a ferromagnetic metal strip and disposed to be circulated about said return rollers;
    a device for depositing product to be heat-treated on the conveying device;
    a device for removing heat-treated product from the conveying device;
    a heating device disposed on one side of said conveyor belt and formed with a group of induction heaters for heat-treating product deposited an the conveying device; and
    a heating device disposed to heat at least one of said return rollers.

2. The apparatus according to claim 1, wherein said conveyor belt is a steel strip.

3. The apparatus according to claim 1, wherein said heating device is configured to bake bakery products being conveyed on said conveyor belt.

4. The apparatus according to claim 3, wherein the bakery products are wafer products.

5. The apparatus according to claim 1, wherein said induction heaters are disposed on a side of said conveyor belt facing away from the product being heat-treated.

6. The apparatus according to claim 1, wherein said induction heaters are disposed to be individually adjusted in a spacing distance thereof from said conveyor belt.

7. The apparatus according to claim 1, which comprises further heating devices disposed on a side of said conveyor belt opposite from said induction heaters.

8. The apparatus according to claim 7, wherein said further heating devices are infrared heaters.

9. The apparatus according to claim 1, wherein said return rollers are drums of ferromagnetic metal and said heating device disposed to heat said return roller is an induction heater.

10. The apparatus according to claim 9, wherein said drums are formed of steel.

11. The apparatus according to claim 1, wherein said return rollers are disposed substantially horizontally relative to one another, with at least one run of said conveyor belt to be moved in a substantially horizontal direction.

12. The apparatus according to claim 11, which comprises support rollers disposed between said return rollers below an upper run of said conveyor belt.

13. The apparatus according to claim 11, wherein said apparatus for depositing the product is disposed to deposit the product at a first one of said return rollers upstream in a direction of movement of said conveyor belt, in at region in which said conveyor belt rests on said first return roller.

14. The apparatus according to claim 1, which comprises a tensioning device for adjusting a spacing distance between said return rollers and for adjusting a tension of said conveyor belt.

15. The apparatus according to claim 1, which comprises a thermally insulating housing surrounding said conveyor belt and said heating devices.

16. The apparatus according to claim 1, wherein said device for depositing the product on said conveyor belt includes a cooling apparatus.

17. The apparatus according to claim 1 wherein said depositing device for the product includes at least one feeding device formed with a height-adjustable gap.

18. The apparatus according to claim 1, wherein said depositing device for the product includes two counter-rotatable rollers mounted to be adjusted in a mutual distance from one another.

19. A system for producing baked products composed of at least two layers of a baked product and foodstuff between said layers, which comprises:
- an apparatus according to claim 1;
- a device for depositing a foodstuff on an upper side of the product;
- a device for stacking the at least two layers of the product on each other;
- a device for pressing the at least two layers with the foodstuff in between, for deforming and for dividing the product to form individual baked products.

20. The system according to claim 19, wherein said devices are configured to process baked wafer dough and to form a baked product from at least two wafer sheets.

21. A system for producing baked products formed with at least two of a baked product and a foodstuff between the layers, comprising:
- an apparatus according to claim 1;
- first and second apparatuses for producing wafer strips, said first apparatus having assigned thereto a device for depositing a further foodstuff onto a first wafer strip; and
- wherein two wafer strips produced by said first and second apparatuses are laid on each other with the further foodstuff in between; and a pressing device for pressing said two wafer strips together.

* * * * *